United States Patent [19]
Hansen et al.

[11] Patent Number: 5,653,183
[45] Date of Patent: Aug. 5, 1997

[54] PYROLYTIC WASTE TREATMENT SYSTEM

[75] Inventors: Andrew H. Hansen, Las Vegas, Nev.; William C. Walker, Santa Fe Springs, Calif.

[73] Assignee: Balboa Pacific Corporation, Santa Fe Springs, Calif.

[21] Appl. No.: 310,631

[22] Filed: Sep. 22, 1994

[51] Int. Cl.$^6$ .................. F23G 5/12; F23G 5/00
[52] U.S. Cl. .............. 110/346; 110/229; 110/257; 110/258
[58] Field of Search .................. 110/227, 228, 110/229, 211, 257, 258, 238, 242, 110, 226; 202/118; 198/662, 670, 676

[56] References Cited

U.S. PATENT DOCUMENTS

| | | | |
|---|---|---|---|
| 1,235,427 | 7/1917 | Bridewell et al. | 198/676 X |
| 2,357,621 | 9/1944 | Tuttle . | |
| 3,098,458 | 7/1963 | Lantz, Jr. . | |
| 3,592,151 | 7/1971 | Webber . | |
| 4,084,521 | 4/1978 | Herbold et al. | 110/242 |
| 4,094,769 | 6/1978 | Brown | 208/11 R |
| 4,205,613 | 6/1980 | Fio Rito et al. | 110/246 |
| 4,235,676 | 11/1980 | Chambers . | |
| 4,399,906 | 8/1983 | Millsap | 198/662 |
| 4,412,889 | 11/1983 | Oeck | 202/117 |
| 4,439,209 | 3/1984 | Wilwerding et al. . | |
| 4,452,611 | 6/1984 | Richey | 48/111 |
| 4,474,524 | 10/1984 | Kawakami et al. | 414/213 |
| 4,501,644 | 2/1985 | Thomas | 202/99 |
| 4,504,222 | 3/1985 | Christian | 432/139 |
| 4,530,432 | 7/1985 | Christian | 198/676 X |
| 4,648,328 | 3/1987 | Keough | 110/229 |
| 4,759,300 | 7/1988 | Hansen et al. | 110/229 |
| 4,831,944 | 5/1989 | Durand et al. | 110/346 |
| 4,878,440 | 11/1989 | Tratz et al. | 110/233 |
| 4,900,401 | 2/1990 | Horton | 202/117 |
| 5,010,831 | 4/1991 | Halfhide | 110/347 |
| 5,057,189 | 10/1991 | Apffel | 202/113 |
| 5,195,449 | 3/1993 | Michimae | 110/257 |
| 5,224,432 | 7/1993 | Milsap, III . | |
| 5,411,714 | 5/1995 | Wu et al. | 110/110 X |

FOREIGN PATENT DOCUMENTS

| | | |
|---|---|---|
| 3305161A1 | 8/1984 | Germany . |
| 228749 | 2/1925 | South Africa . |
| WO92/18214 | 10/1992 | WIPO . |

*Primary Examiner*—Henry A. Bennett
*Assistant Examiner*—Susanne C. Tinker
*Attorney, Agent, or Firm*—Fulwider Patton Lee & Utecht

[57] ABSTRACT

A system for pyrolysis of hydrocarbon constituents of waste material including a treatment unit featuring a retort with a ellipsoidal cross-section forming a first retort half and a second retort half, the material to be treated being selectively deposited in only one half of the retort at a time during any given period of system operation, to avoid abrasion and wear of the half not in use, thus effectively doubling the life of the retort component. Another feature of a treatment unit according to the invention is a heat reclamation arrangement that introduces gases that have first been combusted to supply heat energy to the retort through a conduit directly into the interior of the retort, to improve the efficiency with which pyrolysis takes place. Further, the treatment unit has an exhaust and cleaning arrangement to render gases produced during pyrolysis substantially free of pollutants such that the gases can be vented to the atmosphere. The exhaust and cleaning arrangement is characterized by a plurality of selectively detachable gas injection tubes, which provide fuel for thermal oxidation of the gases. Each injection tube can be removed for cleaning independently of any other injection tube, and removal can be accomplished without disrupting operation of the system. Still another feature of the treatment unit of the invention is the redundancy and high-temperature resistance of the seal between the retort and other components of the unit.

14 Claims, 7 Drawing Sheets

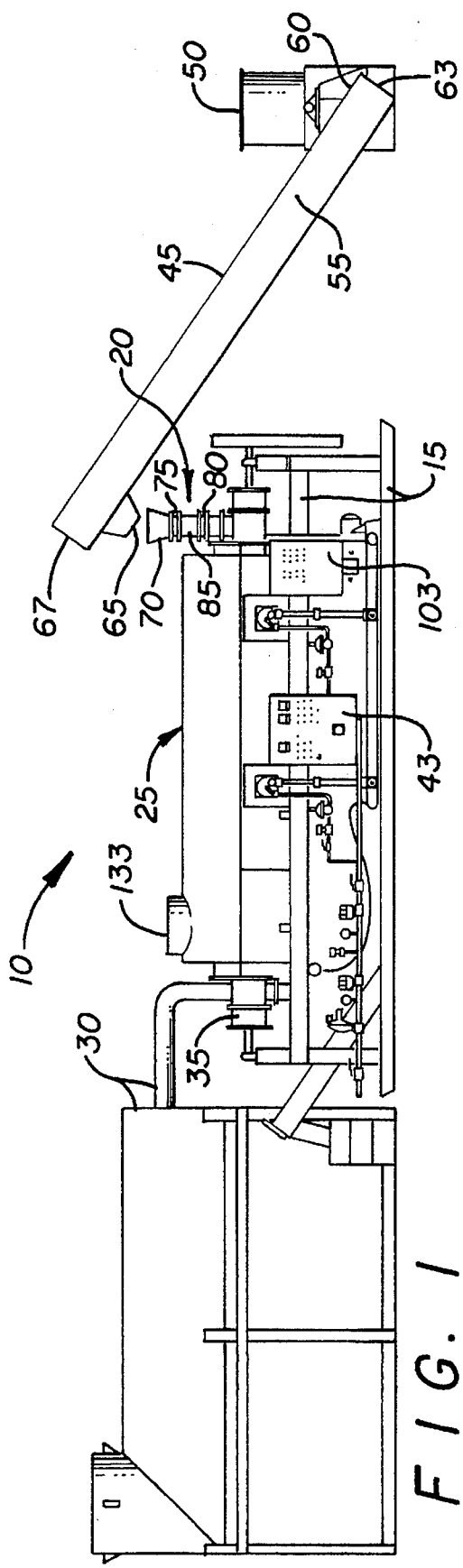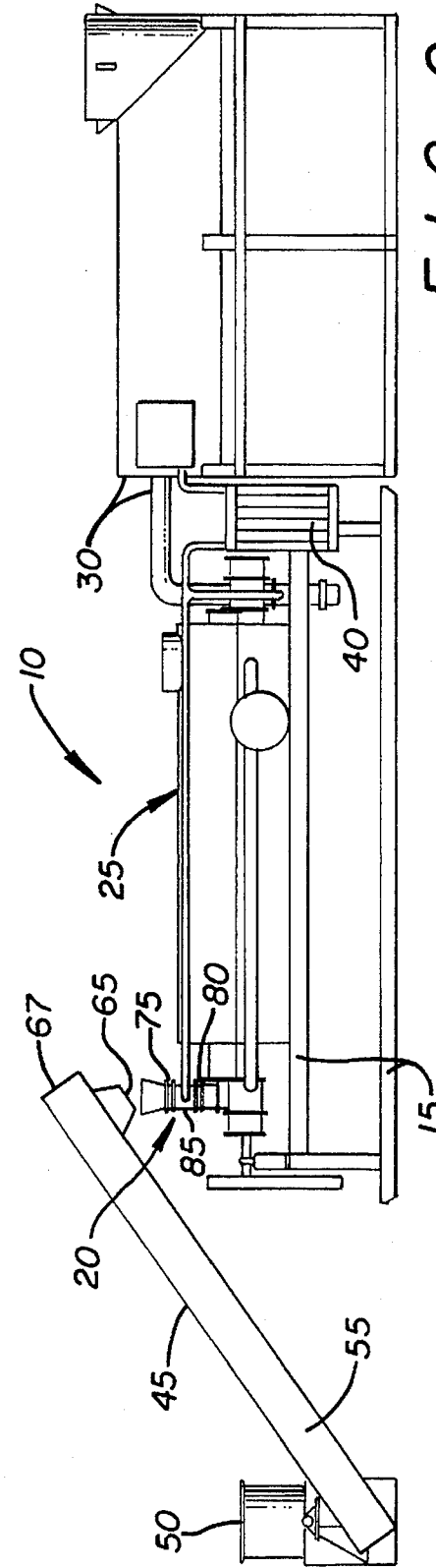

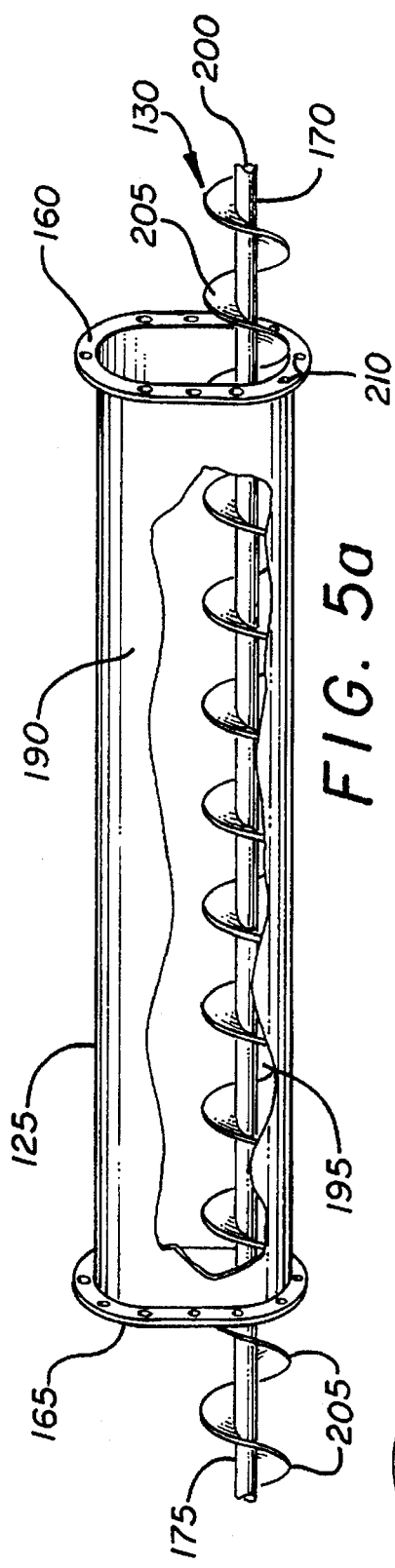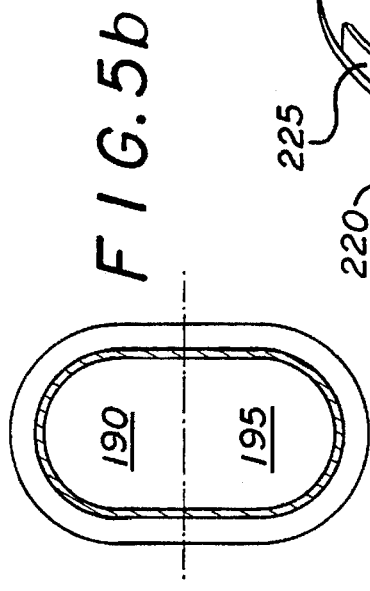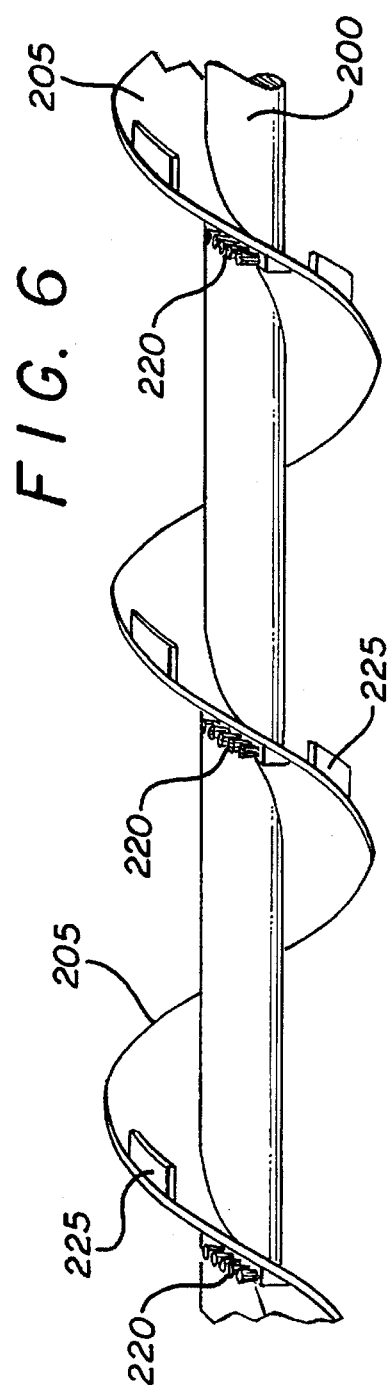

PYROLYTIC WASTE TREATMENT SYSTEM

BACKGROUND OF THE INVENTION

This invention relates generally to waste treatment systems, and, more specifically, to waste treatment systems whereby the waste is treated using pyrolytic processes.

Modernly, ways of dealing with material that is an undesirable result of an otherwise useful product or process have, of necessity, become a serious concern of industrialized nations. As used here, the term "waste" is intended to encompass a wide variety of such material, for example, that material which is considered undesirable or not useful by reason of defects, or damage, or because the material is considered superfluous to, or an unwanted by-product of whatever process or product produced it. Waste is troublesome not only because of the fact it represents something that cannot be used for any beneficial purpose, but because it presents hazards to the environment in terms of the space it takes up and the deleterious effects it has on living organisms. For a considerable period, the disadvantages inherent in waste were largely ignored or, at least afforded little weight when a new process or new product that would produce waste was introduced, the benefits to society that the process or product would bestow being considered paramount. Inevitably, however, the increasing volume of waste and the dangerous conditions presented by it forced more attention to be paid to ways of dealing with the material, such that planning for waste treatment often today is an important consideration in the design of a new process or product.

Pyrolysis long has been known to those skilled in the art of waste treatment as an effective process for reducing the organic components of a variety of compositions of waste material, such as conventional industrial and municipal waste, to products which present no harm to the atmosphere and which can be used in whole or in part to provide a useful source of energy or a material that can be recycled into a product having commercial value.

The pyrolytic process employs high temperature in, most desirably, an atmosphere substantially free of oxygen (e.g., in a practical vacuum), to convert the solid organic components of the waste to other states of matter such as pyrosylates in a liquid or vapor phase. The solid residue remaining after pyrolysis commonly is referred to as char, but this material may contain some inorganic components, such as metals, as well as carbon components, depending on the nature of the starting waste. The vaporized product of pyrolysis further can be treated by a process promoting oxidation, which "cleans" the vapors to eliminate oils and other particulate matter therefrom, allowing the resultant gases then to be safely released to the atmosphere.

A typical waste treatment system utilizing pyrolysis has an input structure for introducing the waste; a chamber or retort from which air can be purged and in which pyrolysis processing occurs; a feature for raising the temperature inside the chamber; an element that allows the vaporized waste material or "off-gases" to be vented to the environment, which element may or may not include some feature for cleaning or scrubbing the gases; and an assembly through which is discharged the solid or molten residue of the pyrolyric conversion process.

Systems that rely upon pyrolysis often are designed with principal attention being given to the criterion that the system be optimally efficient. For example, to encourage consistent results from the pyrolyric conversion process, various methods and apparatuses commonly are used to pre-treat the waste before it is introduced into the pyrolytic chamber. These include pre-sorting or separating the waste into constituents on the basis of weight, shredding the material to make it of relatively uniform size and perhaps blending it with other pre-sorted material to promote even distribution of the waste as it is introduced into the retort. Several techniques have been employed to reduce the level of moisture in the waste before introducing it into the machine, because the presence of moisture makes the pyrolytic process less efficient. Such techniques include drying by desiccation or through the application of microwave energy.

Other features often are provided to continuously move waste through the treatment unit while the system is being operated, such as a form of conveyance arrangement. Screw conveyors or conveyor belts oriented at an incline have been used to ramp waste material in units of a defined volume and at a defined rate of flow up from a storage bin or pre-treatment assembly at the ground level to a charging hopper at the top of the treatment unit through which waste is metered into the pyrolytic chamber. Screw conveyors, auger screws and worm conveyors all have been used to impel waste through the retort while pyrolysis takes place, again, to encourage predictable results from the process.

It is well known that the efficiency of pyrolysis is negatively effected by the presence of oxygen. One of the adverse effects oxygen has is to increase the degree to which the chemical reactions taking place during conversion are explosive, which explosiveness, in turn, increases the turbulence in the chamber and tends to result in the recombination of the released gases with the solid material being processed, making the conversion less complete and thus inefficient. Accordingly, waste treatment systems have been provided with elements that guard against the introduction of oxygen from ambient air surrounding the treatment unit. For example, various air-lock arrangements are known which can be disposed at the point at which waste is introduced into the pyrolyric chamber and also at the point at which the solid residue is discharged from the unit, to insure the retort is kept free of appreciable amounts of oxygen. Vacuum purging elements also have been employed in various stages of the system to periodically remove gases from the pyrolyric chamber to eliminate any air that may have been introduced into it.

The manner in which the retort chamber is supplied with heat energy to sustain pyrolysis also can effect the efficiency with which the process can be carried out. For example, it has been found that uniform application of heat to the outer wall of the retort, through which it is conducted into the interior of the chamber, reduces the risk that the retort will buckle from uneven distribution of high temperatures and tends to encourage a more even distribution of heat and consistency of temperature throughout the chamber, which leads to consistent processing results. System features provided to address even heating include those directed to the manner in which the primary source of heat energy, commonly fuel gases being combusted in a heating chamber, is arranged with relation to the retort, and the number and placement of fuel gas injection ports, etc.

It further has been known to provide a feature which encourages the efficient use of heat to sustain the pyrolyric process, such as one that allows the recycling of gases that have once been combusted to supply heat energy to the pyrolytic chamber back through the gas injection port where the gases can be ignited again with a fresh supply of oxygen or air.

Efficiency-promoting elements also can be provided for the processing and recycling of off-gases or vapor pyrosylate. For example, it is known that if a pressure gradient is maintained between the retort and the gas processing arrangement in the direction of the exhaust, the vapor pyrosylate naturally will tend to flow into the cleaning elements. To avoid wasting energy, the cleaned high temperature gases can be used to provide energy to some sort of generating station, such as to heat water in a boiler that supplies a steam generator.

Efficiency considerations then, are of critical importance in designing a waste treatment system or in evaluating the practical value of a system already in existence. For obvious reasons, features that contribute to the safety and reliability with which a system functions also are of primary import. However, there is another criterion that is of great practical concern when a system is being designed or selected, and that is the relative ease with which a treatment unit can be maintained. The maintainability of the system must be considered in assessing for how long a treatment unit can be expected to be continuously operated and for how long it must be shut down to perform refurbishing or repair procedures. The useful life or mean-time-between failure of individual unit components similarly must be considered in predicting how often operation will have to be disrupted to replace particular components, with attention being given to how easily the component can be accessed and how costly refurbishing, repair or replacement procedures are likely to be in terms of labor and material expenses. Accordingly, gains in efficiency afforded by certain features of prior art waste treatment systems can be overshadowed by the less-than-optimum maintainability of such systems, which leads to frequent, labor-intensive, and complicated maintenance routines that are associated with long periods of system downtime.

What has been needed, therefore, and heretofore has been unavailable is an improved pyrolytic waste treatment system that achieves both optimal maintainability and efficiency, and which nevertheless is safe, reliable and capable of operation with a wide variety of compositions of waste material. The present invention satisfies this need.

SUMMARY OF THE INVENTION

Briefly, and in general terms, the present invention provides a waste treatment system having features that in combination result in an apparatus and method for waste treatment that is characterized by enhanced maintainability as well as by optimal efficiency, with the additional attribute that many of the products of the treatment process can be used beneficially; either while treatment is on-going, e.g., to generate energy, or following processing, e.g., to incorporate the residue of waste or portions thereof into building materials or other products having commercial or environmental value.

In a presently preferred embodiment of a system, by way of example and not necessarily by way of limitation, a waste treatment unit is provided having the following primary components: a main frame or superstructure; an input stage or in-feed element through which the waste material to be treated is introduced through an arrangement of valves or gates that can be controllably synchronized to prevent the unwanted incorporation of air or oxygen into the pyrolytic process; a pyrolyric assembly comprised of an thermally insulated outer housing coaxially surrounding an ellipsoidally-shaped retort or pyrolyric chamber in which is disposed a rotatable screw that, by virtue of a plurality of helically-oriented flights, is capable of conveying waste through the retort as pyrolysis is taking place, the space between the outer housing and the retort defining a heating chamber in which fuel gases supplied by gas jets in communication with the heating chamber through gas injection ports are combusted to provide a source of heat energy for pyrolysis; an arrangement of elements through which gases liberated from the feed material during. pyrolysis are processed to draw off and/or eliminate pollutants contained therein, by a combination of condensation and thermal oxidation and then either vented harmlessly to the atmosphere or routed to supply energy, such as to a steam generator or the like; and an output stage or discharge element, also characterized by an air-lock implemented by synchronized valves, through which the solid residue of pyrolysis is discharged for immediate disposal or recycling, or post-pyrolysis sorting or processing.

One of the features of the system which contributes to improved maintainability is provided in the retort assembly. The assembly is comprised of an innermost, elongated ellipsoidal chamber that serves as the retort, which is open at both ends and receives a rotatable screw conveyor to move the waste through it; a thermal converter consisting of a generally cylindrical retort housing, which has a diameter substantially greater than that of the retort and which surrounds the retort, the housing being equipped with a plurality of natural gas burners to provide heat energy for pyrolysis; and a pair of fittings affixed to the main frame of the unit, each of which is sized to fill an open end of the retort when the retort is bolted to it.

The ellipsoidal shape of the cross-section of the retort is such that if the retort were bisected along any axis, two halves would be created, each of which being a mirror image of the other. Therefore, when the chamber is bisected along an imaginary longitudinal axis at the center of the ellipse, a first retort half and a second retort half are created.

The screw is mounted in the end fittings such that it is disposed in only one of the two halves of the retort, leaving a void in the other half. When the screw rotates to evenly distribute the material for pyrolysis and to convey the waste through the retort chamber, the helical extensions on the screw shaft can carry waste to the chamber surface or can otherwise cause abrasion of that surface. Because the screw only functions in one-half of the retort during any given period of operation, the two halves do not become soiled with pyrolyric residue or abraded at the same rate. When one-half of the retort requires refurbishing, the unit can be shut down and partially dismantled to release the retort from the end fittings so that it can be rotated through 180 degrees. Thus, the other, cleaner half of the retort is presented to the screw conveyor, and the useful life of the chamber essentially is doubled over retorts of known design.

The low maintenance aspect of the system further is enhanced by characteristics of the screw conveyor in the retort. Sweeping brushes and lifting tabs are provided on the helical extensions encircling the shaft of the conveyor, which will contact the floor of the chamber as the screw rotates to move waste through the retort. The brushes and tabs tend to keep waste-in-process or residue from pyrolysis from adhering to the surface of the retort and building up thereon, which build-up eventually inhibits effective operation of the screw. The constant sweeping and lifting action of these elements further prolongs the need to shut down the system to open the retort for cleaning or repair.

Another aspect of the invention that contributes to maintainability is to be found in the arrangement by which the retort assembly is sealed from the housing, so that a practical vacuum can be maintained therein during pyrolysis and the unwanted introduction of air can be avoided. A graphite cable resistant to the very high temperatures established in the pyrolytic chamber is wrapped at four locations around the shaft of the screw conveyor, that is, at two locations on either side of where the screw conveyor will extend from the innermost chamber of the retort when the unit is fully assembled. Each cable is made to sealably fill the space between the retort outer housing and the screw shaft by the application of force through an arrangement of nuts and bolts and other force-conveying elements to a tension plate that is in contact with the end of each piece of cable that is furthest from the innermost chamber. If any one of the four seals in the sealing scheme weakens, the bolt can be tightened to increase the tension applied to the cable and thus to reseat the chamber.

Because there are two distinct lengths of cable spaced apart from each other along the longitudinal axis of the screw shaft, with a pair of tension-applying elements provided for each length, the integrity of the seal between the inner chamber of the retort and the other parts of the treatment unit is not compromised even if one of the two individual seal assemblies fails. Thus, the redundancy in the sealing scheme contributes to the safe operation of the system as well as to maintainability.

Still another attribute of the invention prolongs the period over which the system can be operated continually before shut down for refurbishment or repair, and this attribute is associated with the cleaning or scrubbing step applied to the gases drawn off from the pyrolytic chamber. Oils and other particulate matter carried by the off-gases may not be completely oxidized during this step, and thus can accumulate in the gas injection ports that are used to ignite the vaporized pyrosylate, causing the ports to become clogged and thus unusable. In the treatment unit of the invention, a plurality of gas injection ports are provided at the base of the afterburner cone so that one of the ports can be removed from cleaning or replacement while the others are retained in place. Accordingly, a maintenance timetable can be established for periodically refurbishing each of the three ports, leaving at least one port in position and functioning so that the system does not have to be entirely shut down to refurbish the gas injection elements.

Other features of the system improve the efficiency with which the unit can be operated. Most notably, a heat reclamation scheme is provided in which a heat pump conveys some of the gas in the heating chamber in which combustion is occurring directly into the retort, thus contributing to the even distribution of heat in the retort and allowing pyrolysis to be sustained with less fuel gas introduced by the natural gas burners. In addition, the scheme of synchronized valves at both the input stage and the output stage at once allow the rate of flow of material through the treatment unit to be controlled and prevent the introduction of air into the retort which, if present, could detract from the efficiency with which pyrolysis can be accomplished.

A preferred method for treating waste according to the system of the invention can be summarized as follows: After the waste is pre-treated by a mixing arrangement which sorts, shreds, crushes and dries the material to remove moisture from it, the waste is routed to the treatment unit by an inclined screw conveyor of conventional design. The conveyor feeds the material into a hopper at the input stage of the unit, where an arrangement of synchronized valves or gates open and close to meter waste into the unit without simultaneously introducing unwanted air into the system.

The material then is moved through the retort or pyrolytic chamber by another screw conveyor of novel design, which is rotatably suspended in one-half of the retort, which half is a mirror image of the other half of the chamber. The half of the retort in which the screw is not disposed serves as a void into which gases produced by pyrolysis of the organic components of the waste can be drawn off for cleaning and subsequent exhaust to the atmosphere or diversion for use by a generator. The existence of this void reduces the turbulence occurring in the retort around the screw conveyor which, if present to a significant degree, can result among other things in the recombination of off-gases with the waste.

To prevent environmental pollution, the pyrosylate in vapor form is continually drawn off from the retort and channelled through a conduit to a combination of elements in which the gases are cleaned before being vented to the atmosphere through an exhaust chimney. The cleaning process entails injecting additional fuel gas and routing outside air into the gases passing through a burner cone, and then igniting the resultant mixture to eliminate the pollutants to the extent necessary by the process of thermal oxidation. The cleaned gases can be used to supply energy in the form of heat to a boiler that, in turn, can be used to supply a steam generator. Meanwhile, the solid pyrosylate residue, such as carbonaceous char or ash, is discharged from the unit through the output stage, which like the input stage is characterized by a bivalve arrangement to protect against the unwanted introduction of air into the pyrolytic chamber.

A system according to the invention thus provides a method and apparatus of treating a wide range of waste material with varied composition in a manner which optimizes the efficiency of the treatment process and accomplishes the same safely and reliably with a nominal requirement for maintainability.

Other features and advantages of the present invention will become apparent from the following, more detailed description of the invention, when taken in conjunction with the accompanying exemplary drawings.

BRIEF DESCRIPTION OF THE DRAWINGS

FIG. 1 is a front elevational view of a waste treatment unit in accordance with the invention;

FIG. 2 is a rear elevational view of the treatment unit shown in FIG. 1;

FIG. 5a is a perspective view, partially cut away, of the retort and screw conveyor of the pyrolytic assembly of the invention;

FIG. 5b is a cross-sectional view taken substantially along the line 5—5 in FIG. 5a of the retort of FIG. 5a;

FIG. 6 is an enlarged, partial elevation view of the screw conveyor disposed in the retort of a treatment unit in accordance with the invention;

DETAILED DESCRIPTION OF THE PREFERRED EMBODIMENTS

Figure 3:
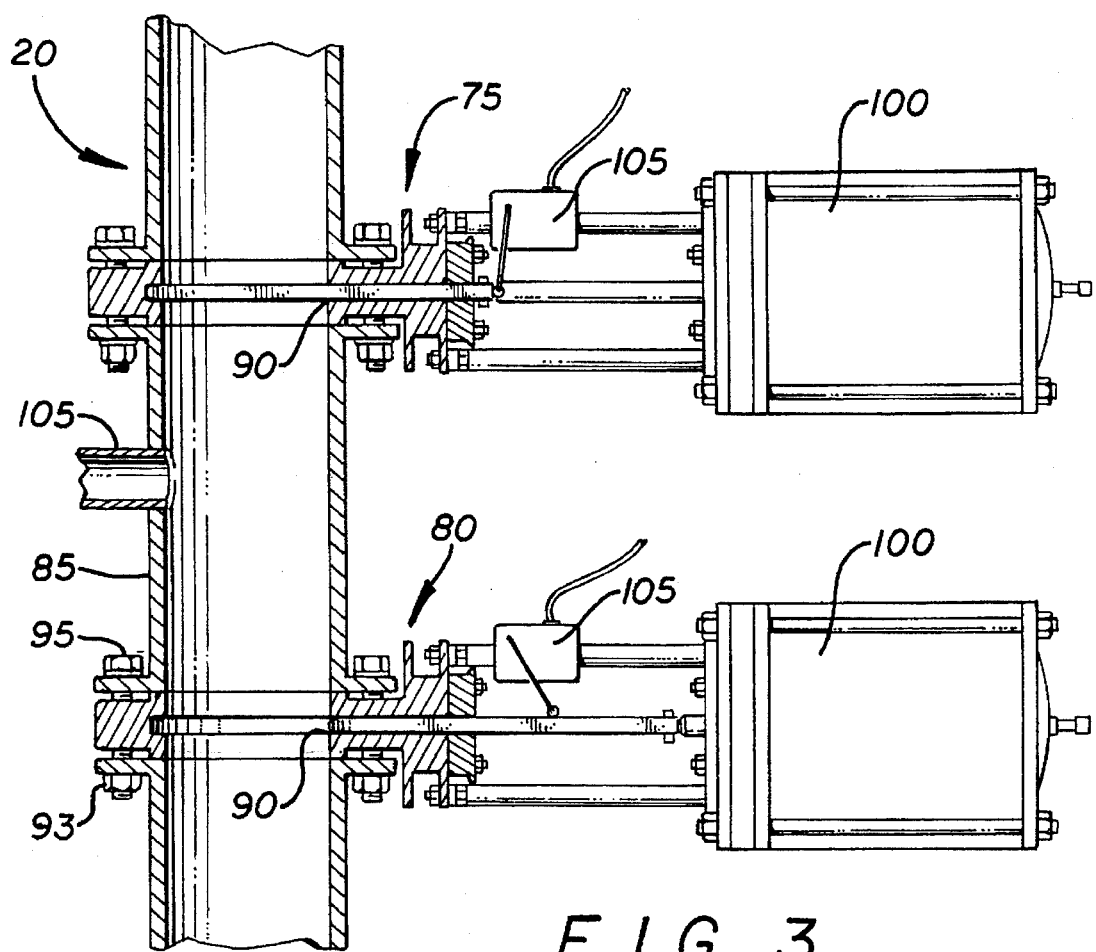
FIG. 3 is a partial front elevational view of the valves or gates of the input assembly of a treatment unit according to the invention.

In the following description, the waste treatment unit of a pyrolytic waste treatment system according to the invention is described with reference to FIGS. 1–12 of the drawing, in which like reference numerals are used to refer to common elements or features among the Figures. A method according to the invention is described with reference to FIG. 13 of the drawing.

The interrelationship of the principle components of the waste treatment unit 10 perhaps is best understood with reference to FIGS. 1 and 2. A main frame or superstructure 15 supports an input assembly or in-feed stage 20, a pyrolyric assembly 25; an assembly 30 for exhausting and subsequently cleaning and venting the product of pyrolysis in the vapor state (gas or vapor pyrosylate) and an assembly 35 for discharging the products of pyrolysis in the solid state (residue, char, ash or solid pyrosylate).

As best observed in FIG. 2, a condenser 40 also can be provided to condense out oils and other particulates in the off-gases, so the condensate can be collected and stored as waste or otherwise recycled. A main control panel 43 and an ancillary control panel 103 are provided from which operation of the system of the invention can be regulated and adjusted.

It is noted here that the pyrolyric assembly 25, as well as other components of the treatment unit 10, must be adequately insulated from the environment exterior to the unit to insure the safety of persons in the vicinity of the unit while it is being operated. Depending on the British thermal unit (BTU) value of certain composite elements of the waste material being pyrolyzed, temperatures ranging from 150° to 2000° F. can be produced while the system is functioning. Even higher temperatures can exist in the assembly 30 provided for exhausting and then cleaning the vapor pyrosylate, by virtue of the thermal oxidation occurring therein. Accordingly, insulative layers may be provided throughout the unit at appropriate locations, which locations would be readily apparent to one skilled in the art. It has been found that commercially available insulators incorporating ceramic wool are particularly well-suited when common compositions of industrial or municipal waste are being processed.

An arrangement of conveyance elements 45 is employed to conduct the waste material to be pyrolyzed from a feed tank or storage bin 50 to the input assembly 20, via a conveyance tube 55. This tube has an inlet 60 at a first end 63 which is disposed in the feed tank and an outlet 65 at a second end 67 of the tube. A rotatable screw conveyor of conventional design (not shown) is provided within the tube that has a plurality of flights helically disposed at regular intervals along its length. The flights controllably pick up and transfer waste material in a certain volume and at a selected rate to sequentially move the material as the screw shaft is mechanically rotated, as with an electric motor or other suitable means, towards the input assembly 20, depositing the waste through the outlet into charging hopper 70, from which it is metered by the synchronized operation of the two valves 75 and 80 into a conduit 85, which leads into the pyrolyric assembly 25.

As has been noted previously, pyrolysis is most efficiently carried out in an environment that is substantially free of oxygen because the presence of oxygen causes the chemical reactions taking place to be more explosive in character, resulting in turbulence within the retort which encourages the recombination of the hydrocarbon off-gases with the molten or solid material being processed. Not only does this effect make the liberation process take longer, but it also can result in the production of pyrosylates that are less friendly to the environment and which require additional, more elaborate processing to neutralize the hazardous effects. Accordingly, the treatment unit 10 of the invention has several features to prevent the introduction of ambient air containing unwanted oxygen into the pyrolytic assembly 25.

First, the input assembly 20 through which waste is introduced to the treatment unit 10 is equipped with a pair of valves 75,80 that can be caused to sequentially and temporarily seal off the conduit 85 at different locations as waste material is passing through it, thus effectively providing an air-lock during the in-feed process.

As best shown in FIG. 3, each valve 75,80 is in communication with the conduit 85 through apertures 90 in the conduit wall and each is connected to the conduit by a series of nuts 93 and bolts 95. The valves are caused to move into the conduit to seal it or out of the conduit to allow free passage of the waste by actuating motors 100 that are energized by electrical signals originating from the control panel 103. Valves that are operated by pneumatic or hydraulic means also could be employed with success in a unit constructed in accordance with the invention. The operation of the valves is timed so that the first valve 75 never is open when the second valve 80 is open and vice versa.

Whenever the first valve 75 is open, a pre-determined quantity of waste fills the section of the conduit 85 segmented by the closed second valve 80. The first valve then closes, and a limit switch 105 in series with the actuating motor 100 for that valve is the source of a signal that indicates to a control panel 103 that the valve is closed, whereupon a responsive signal is sent to the actuating motor of the second value, causing the second valve to open. Optionally, the conduit 85 is equipped in the area between the two valves 75,80 with an evacuation port 107 connected to a source capable of drawing a vacuum within the segment of the conduit that is defined when both valves are closed, to eliminate air completely from the waste material before the second valve 80 opens to allow it to move further along the conduit to the pyrolytic assembly 25.

To take advantage of the force of gravity to propel the waste, the conduit of the input assembly 20 is oriented along a vertical axis of the treatment unit 10, and the valves 75,80 enter the conduit at an angle that is generally perpendicular to that axis. Other orientations of both the conduit and the valves are contemplated, however, which might be preferable given particular site requirements, such as space limitations. The beneficial effect of gravity could be substituted for by some mechanical force supplied by, for example, a motorized conveyor belt.

Similarly, although the pair of valves 75,80 has been found to be preferred in particular applications to create an air-lock effect at the input assembly 20 of the unit 10, a more complex arrangement including additional valves or other metering elements might be equally adequate in other situations, not only to prevent oxygen from entering the unit, but also to improve the ability to control volumetric flow or to control pressure gradients in the system.

Other features for keeping oxygen out of the pyrolytic process are inherent in the configuration of the pyrolytic assembly 25 which has three primary elements, one of these being an important component of the treatment unit 10 which contributes to enhanced maintainability.

Figure 7:
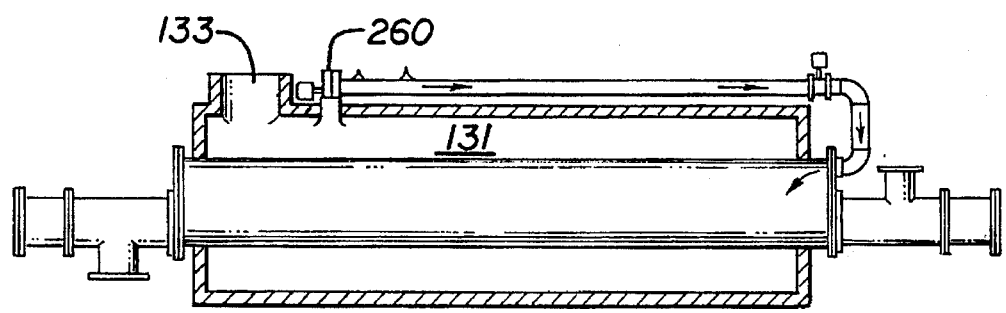
FIG. 7 is a partial, front elevational view of a heat reclamation arrangement according to the invention.

As can be appreciated with reference to FIGS. 1, 2, 5a and 7, the pyrolytic assembly 25 comprises an outer housing 120 that coaxially surrounds a pyrolytic chamber or retort 125, as is shown in FIG. 5a in which a rotatable screw conveyor 130 is disposed. When the unit 10 is fully assembled as is hereinafter described and as shown in FIG. 7, fuel gases are combusted in heating chamber 131 or the space defined by the inner surface 135 of the housing 120 and the outer surface 140 of the retort 125. The heat generated by this combustion provides a primary source of energy to initiate pyrolysis of waste material that is being impelled through the retort 125 by the rotation of the screw conveyor 130. An exhaust port or chimney 133 is provided to vent combusted fuel gases generated in the outer housing 120 whenever necessary to relieve pressure in the pyrolytic assembly.

All of the elements of the treatment unit 10 that are operated under high temperature conditions, such as the outer housing 120, the retort 125, and the screw conveyor 130, desirably are manufactured from a material that is resistant to degradation during long periods of exposure to high temperatures. For obvious reasons, the material used for the retort 125 and the screw conveyor 130 also should be resistant to corrosion from the continuous pyrolysis occurring inside the retort. Various alloys known to those skilled in the art are available that exhibit the characteristics of temperature-resistance and corrosion-resistance, for example, steel alloys or alloys containing proportions of nickel, chrome and silica.

The outer housing 120 is generally cylindrical, but could be provided with a cross-section that is other than circular in order to meet space requirements or to promote more even conduction of heat into the retort 125. After assembly, the longitudinal axis of the housing 120 is oriented so as to be approximately parallel to the ground, although other orientations can be implemented without departing from the scope of the invention that may improve the efficiency of the process. The housing 120 is provided with one or more ports (not shown) along its length, to allow the introduction of fuel gas through gas injection tubes into the heating chamber 131 to provide combustion. The ports and gas injection tubes are placed so as to best promote even conduction of heat energy through the wall of the retort 125, to discourage distortion of the shape of the retort and to insure the efficiency of pyrolysis.

Figures 4A, 4B:
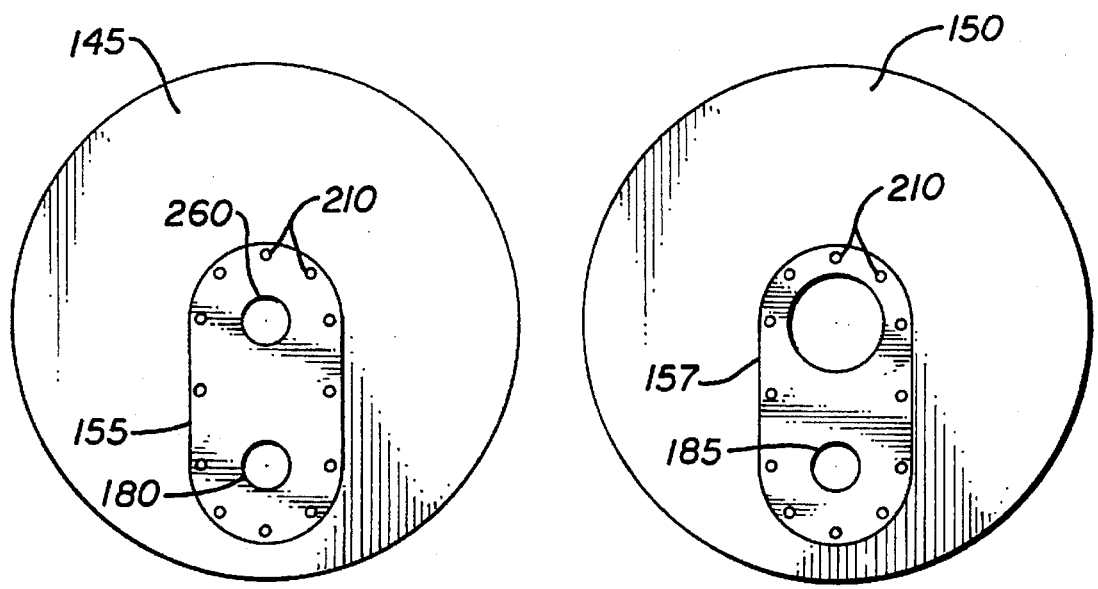
FIG. 4a is an end view of the input end of the pyrolyric assembly of the treatment unit of FIGS. 1 and 2.
FIG. 4b is an end view of the output end of the pyrolytic assembly of FIGS. 1 and 2.

The housing has input end 145 and output end 150, the ends being shown in FIGS. 4a and 4b, respectively, at which the interior of the housing is sealed from the atmosphere. Ellipsoidally-shaped fittings 155,157 are provided to which the ends 160,165 of the retort 125 ultimately will be affixed, and through which the ends 170,175 of the screw conveyor 130 eventually will extend via apertures 180, 185 in the housing ends when the unit 10 is fully assembled.

Turning now to FIGS. 5a and 5b, the features of the retort 125 can be appreciated. The retort 125 has a generally elliptical cross-section, defining a first retort half 190 and a second retort half 195 when the ellipse is bisected with any imaginary line, which halves are symmetrical due to the geometry of the structure. In one embodiment of the invention, the retort 125 is manufactured from a single piece of material for convenience, however, circumstances are contemplated in which forming the retort from two or more pieces that are welded or bolted together also might be desirable. The retort 125 is situated inside the outer housing 120 so that a longitudinal axis of the retort is coaxial with a longitudinal axis of the housing 120.

The screw conveyor 130, having center shaft 200 and a plurality of flights 205 helically-disposed about the shaft, next is mounted in the retort 125. The screw 130 also is aligned so as to be coaxial with a longitudinal axis of both the retort and a outer housing 120. Importantly, as will become obvious from the discussion below, the entire structure of the screw conveyor 130, that is, both the center shaft 200 and the flights 205, is oriented so that it occupies only one of the two retort halves 190,195.

When the three elements of the outer housing 120, the retort 125, and the screw conveyor 130 are properly positioned, the terminal portions or ends 170,175 of the screw conveyor can be threaded through the apertures 180,185 in the fittings 155,157 of the input end 145 and the output end 150 of the housing. The retort 125 then can be bolted to the housing 120 at points of attachment 210 that are provided for that purpose. The input end 145 and the output end 150 subsequently can be sealed to the outer housing 120 by appropriate means such as with bolts or by welding. Alternatively, the outer housing 120 can be formed from a single piece of material, so that the input and output ends 145,150 are an inseparable part of the structure.

The significance to maintainability of the relative positions of the retort 125 and the screw conveyor 130 now will be described. Because the screw operates only in one of the two identical first and second halves 190,195 of the retort, only one-half is exposed to wear by the source waste material during a given period of operation. Accordingly, waste passing through the unit 10 on the screw conveyor 130 that comes in contact with the surface of the retort 125 and that is perhaps extraordinarily abrasive, will wear the surface of only one-half of the retort 125 at a time, leaving the other half relatively unworn. When the half of the retort in which the screw conveyor 130 is disposed becomes worn to the point at which the condition significantly detracts from the efficiency of operation, the unit 10 can be disassembled and the retort 125 rotated through an angle of 180 degrees (°) to present the other, unworn half of the retort to the screw, and system operation can be resumed. Without this feature, whenever the retort 125 becomes too worn to use effectively, the system would have to be shut down for a substantially longer period of time, so that the retort 125 either could be completely refurbished, or alternatively, a new retort could be substituted for the worn structure. Either course of action would not efficiently maximize utilization and consumption of the costly retort.

In addition to enhancing maintainability, the structural arrangement of the retort 125 and the screw conveyor 130 also improve the efficiency of the pyrolytic process. More particularly, the half of the retort opposite the half in which the screw 130 is located at any given time presents a void that is useful in accommodating the large volume of vapor pyrosylate produced while the system is operational. It is not uncommon for a volume of gas to be generated by pyrolysis that is as much as fourteen hundred times greater than the volume occupied by the material when it was initially introduced into the retort 125. The space afforded by the half of the retort not occupied by the screw thus counteracts the turbulence attendant upon the rapid generation of this great volume of gases, which has the effect of making the process more consistent and efficient. The void allows the gases to be released in a manner closer to that which would be natural if the vapors were not contained by the treatment unit 10. Therefore, generated gases are discouraged from circulating about the turning screw conveyor 130 where the gases might recombine with constituents of the waste material being treated or of the residue being formed.

The screw conveyor 130 also has features which contribute to a longer term of useful life than is the case with waste treatment systems of the prior art, and these features are shown in FIG. 6. The flights 205 disposed in helical fashion about the center shaft 200 of the screw conveyor 130 are provided with sweeping brushes 220 and lifting tabs 225. As the screw 130 rotates, the brushes 220 scrape against the inner surface of the half of the retort 125 in which the screw is disposed during any particular period of operation, to dislodge any solid waste material or pyrolytic residue that tends to accumulate thereon. The tabs 225 keep the substances swept by the brushes 220 moving through the retort 125 by lifting the material or residue while the screw is turning. Thus, the features of the brushes 220 and the lifting tabs 225 cooperate to keep the retort 125 clean and free of debris that would detract from the efficiency of pyrolysis for longer periods, leading to less frequent maintenance procedures.

As best observed in FIGS. 4a and 7, a treatment unit 10 in accordance with the invention has an aspect that allows some of the heat energy created or present in the heating chamber 131 to be introduced directly into the retort 125, rather than exclusively by conduction through the walls of the retort, in a further effort to maintain optimal efficiency of the system. A first end 230 of a gas conducting tube 235 is in communication with the heating chamber 131 via an aperture 240 and a fitting 243. This aperture 240 preferably is located near the output end 150 of the housing, for example, adjacent the exhaust port or chimney 133, because the off-gases will tend to flow towards the output end 150 due to a pressure differential to be described in more detail below. The second end 245 of the tube is in communication with the interior of the retort 125, through an aperture 250 and a fitting 255 in the retort fitting 155 at the input end 145 of the housing 120. A heat pump 260 is disposed in the tube 235 near the aperture 240 in the housing, to force gases present in the heating chamber through the tube and into the retort.

To insure that no significant amounts of oxygen that are present in the gases being injected from the heating chamber 13 1, oxygen sensors 265 are provided within the gas conduction tube 235 which, when a certain level of oxygen is detected, will send a signal via the control panel 43 or 103 that will cease the operation of the heat pump and prevent further transfer of the oxygen into the retort 125.

The heat introduced by the heat pump 260 tends to flow with the other gases present in the retort 125 towards the output end 165 due to the pressure gradient, and thus the added gases aid in carrying the vapor pyrosylate out to the series of elements 30 provided for exhausting and cleaning the gases prior to venting the gases to the atmosphere. The direct introduction into the retort 125 of heat energy also has been found to help sustain pyrolysis, leading to a lower consumption of fuel gases freshly provided by the gas injection tubes supplying the heating chamber 131. Further, the feature appears to aid in maintaining an even distribution of heat throughout the retort while pyrolysis is taking place.

Figure 8:
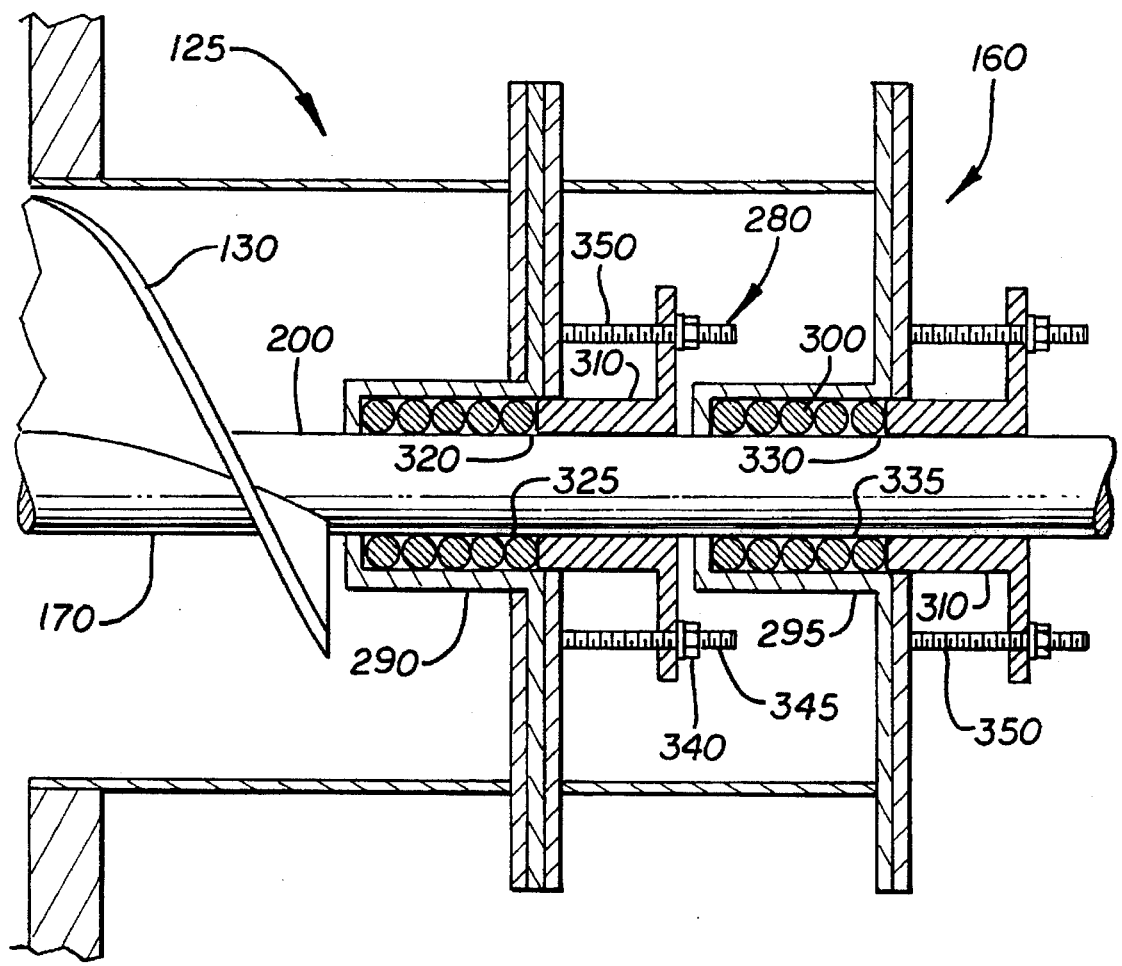
FIG. 8 is a partial, front elevational view of the sealing arrangement of a treatment unit of the invention.

Referring now to FIG. 8, another feature of the treatment unit 10 of the invention is described which at once contributes to the maintainability, safety, and of the system. The feature is directed to the manner in which the retort 125 is sealed off from other structures of the unit that are in continuous contact with or which transiently came into contact with the outside, oxygen-laden, environment.

A sealing scheme or sealing arrangement 280 is provided at both the input and output ends 160,165 of the retort 125, where the portions of the center shaft 200 of the input and output ends 170,175 of the screw conveyor 130 extend out through the apertures 180,185 of the fittings 155,157 at the ends 145,150 of the outer housing 120. Because the sealing scheme 280 employed at both of the ends 160,165 of the retort is identical, the scheme is described with reference only to FIG. 8, which depicts the location at the retort input end 160.

In the course of assembling the screw conveyor 130 into the retort 125, the end 170 of its shaft 200 is encircled or wrapped at two locations 290,295 with a length of cable 300 that has the characteristic of being resistant to the high temperatures generated during combustion of fuel gases in the heating chamber 131 or during pyrolysis in the retort. Graphite is one material that has been found to have this temperature resistant quality. Tension plates 3 10 then are oriented about the cable 300 at four locations 320,325,330, 335 with an appropriate securing arrangement of nuts 340 and bolts 345. Adjustment screws 350 can be turned to cause the plates 310 to press against the cable, resulting in a seal that is resistant to high temperature between the retort 125 and the exterior of the retort. The two locations at which the cable 300 is wrapped and the four tension plates provide redundancy for safety and decrease the frequency with which the unit 10 must be disassembled completely for component replacement. As the cable 300 wears and the integrity of the seal at that length of cable is jeopardized, one or both of the tension plates 310 can be tightened to maintain the seal.

Figure 9:
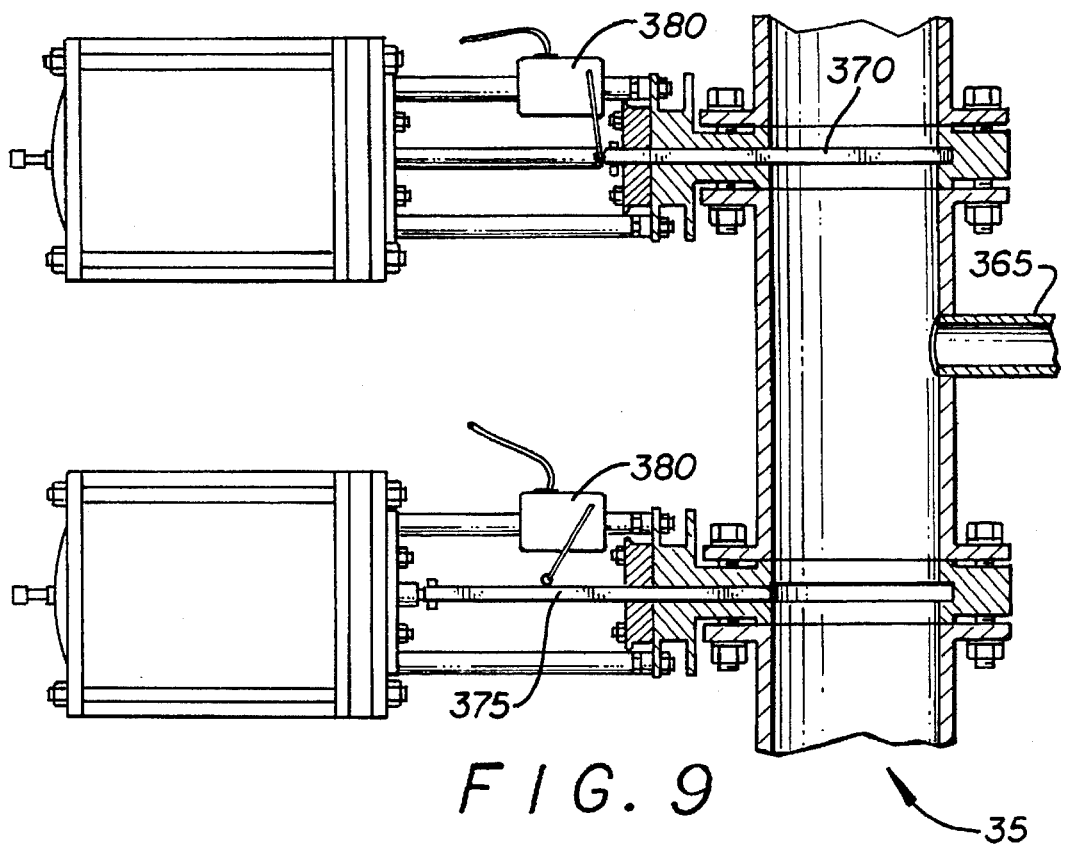
FIG. 9 is a partial, front elevational view of the valves of the discharge assembly of the treatment unit of FIGS. 1 and 2.

As best observed in FIG. 9, the assembly 35 for discharging the solid pyrosylate, residue, char or ash of the pyrolytic process that occurs in a treatment unit 10 according to the invention is characterized by an arrangement of valves 370,375 the opening and closing of which is synchronized to prevent the seepage of oxygen in the ambient air into the retort 125 in which pyrolysis is taking place. Reference is made to the description hereon of the operation of the valves 75,80 of the input assembly 20 to best appreciate the manner in which the discharge assembly 35 functions as an air-lock to discourage oxygen from entering the retort.

Discharge conduit 365 receives solid residue or ash from the output end 165 of the retort 125 as it falls; assisted by gravitational force, from the output end 175 of the rotating screw conveyor 130. Synchronized valves 370,375 then function in a manner substantially identical to that in which the valves of the input assembly 20 function, resulting in the discharge of the residue from the treatment unit 10 at a controllable rate, without the concomitant introduction of air from the environment exterior to the unit into the retort. Limit switches 380 control the opening and closing of the valves 370,375 so that neither of the valves can open unless the other is fully closed. A purging port 385 also is provided in the conduit 365 which can be connected to a vacuum source, to remove air before the valve 370 most proximal to the retort is opened.

Figure 10:
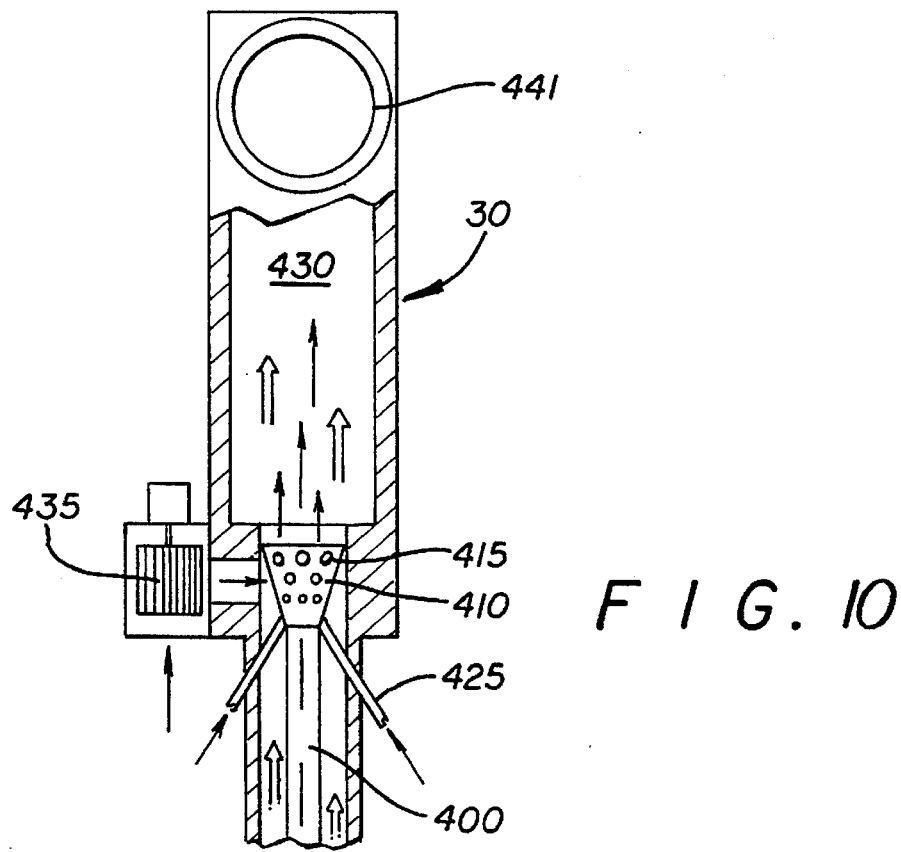
FIG. 10 is a partial plan view of the gas exhaust and cleaning assembly of a unit of the invention.
Figure 11:
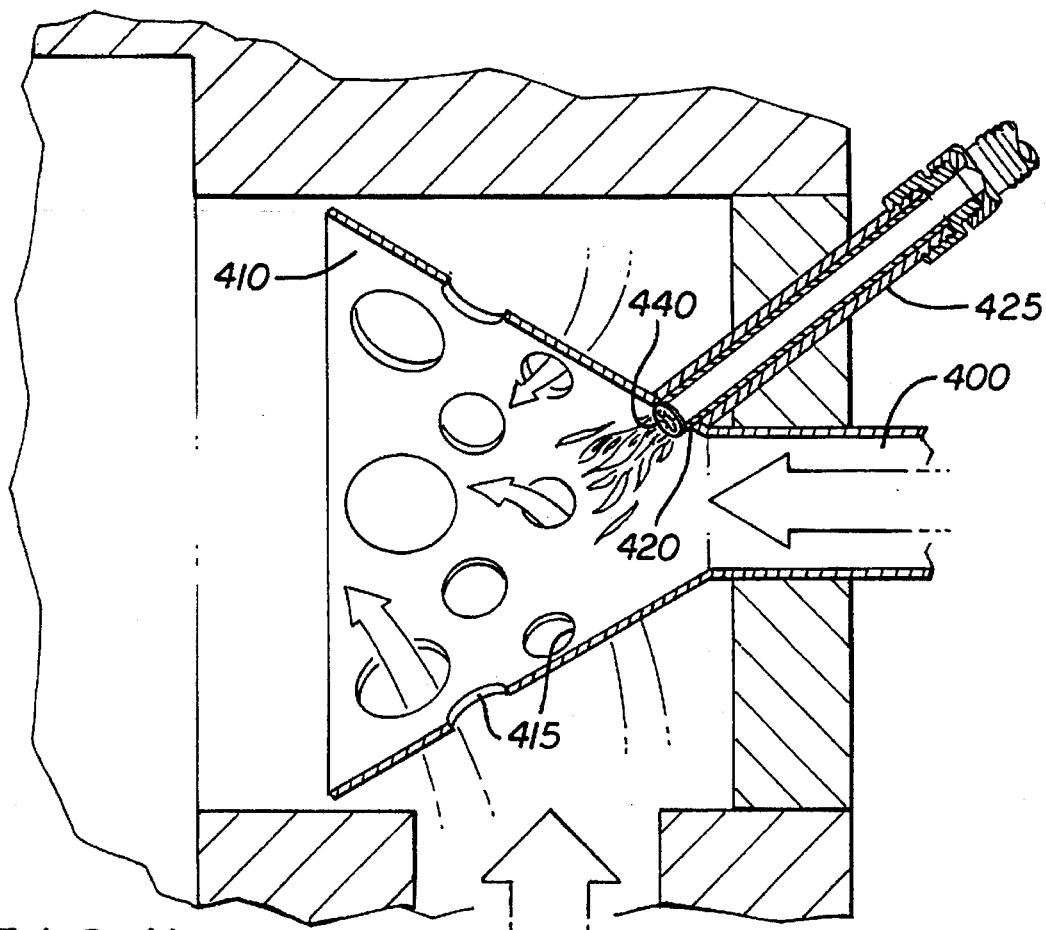
FIG. 11 is partial, elevational view of the burner cone and gas injection tubes of the gas processing arrangement of the invention.
Figure 12:
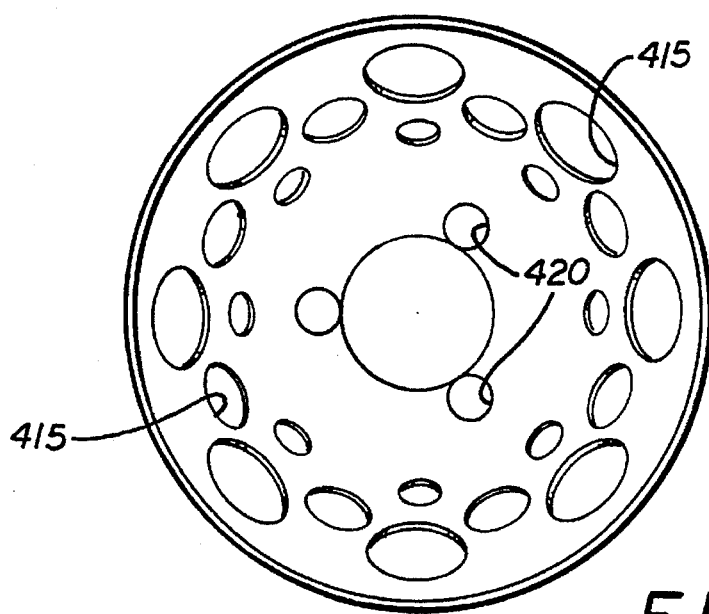
FIG. 12 is a partial, end view of the burner cone of FIG. 10.

Turning attention now to FIGS. 10, 11 and 12, now described is the arrangement of elements 30 provided to first exhaust gases from the retort 125 and then to clean or scrub the gases to free them of pollutants before venting the same to the atmosphere.

The arrangement 30 is comprised of four principal elements, namely, an input channel 400 that carries off-gases from pyrolysis away from the retort 125; an afterburner or burner cone 410 having a plurality of fresh air inlets or ports 415 and a plurality of gas injection ports 420; gas injection tubes 425 corresponding to each of the gas injection ports; and a chamber 430 in which the gases are retained until thermal oxidation of the pollutants therein has been accomplished prior to venting the gases to the atmosphere.

The off-gases naturally tend to flow in the channel 400 in the direction of the burner cone 410, because the pressure at the output end 165 of the retort 125 commonly is higher than the pressure in the thermal oxidation chamber 430. However, the movement of gases in the appropriate direction further can be encouraged by providing a blower or inductor fan 435 that tends to draw the gases into the burner cone 410. The blower 435 also facilitates bringing fresh air into the burner cone through air inlets 415. The gas injection tubes 425 have injection apertures 440 through which a fuel gas such as natural gas is introduced. Each tube 425 is removably mounted by screw-type fittings of conventional design (not shown) so as to extend into the burner cone 410 through gas injection ports 420.

During system operation, off-gases entering the chamber 430 are thermally oxidized after combination with air and ignition by the fuel gases coming in through the gas injection ports 420. The oxidation process will remove dirty oils and other matter that has not been eliminated by pyrolysis from the gases. The temperature at which thermal oxidation is carried out, and the amount of time the gases are retained in the oxidation chamber 430 prior to being vented through chimney 441, both vary depending on the known or predicted constituents of the starting waste material. For example, higher oxidation temperatures and longer preventing chamber retention times are required when the vapor pyrosylate is generated from waste that contains toxic organic compounds such as polychlorinated biphenyls (PCBs), dioxins, or furans.

Importantly, the gas injection tubes 425 contribute to the enhanced maintainability of the treatment unit 10 by virtue of the fact that each can be removed independently of the other for cleaning or replacement without disrupting system operation. The ends 443 of the tubes 425 that extend into the burner cone 410 can become closed off when the unit has been functioning for sustained periods, for example, because the injection apertures become clogged with oils and other material that condenses out of the off-gases prior to oxidation. Because each tube 425 can be unscrewed independently of any other tube 425, the elements each can be removed without disrupting the supply of fuel gases entering the burner cone 410 through the other ports. Accordingly, the unit does not have to be completely shut down whenever periodic maintenance is required.

Figure 13:
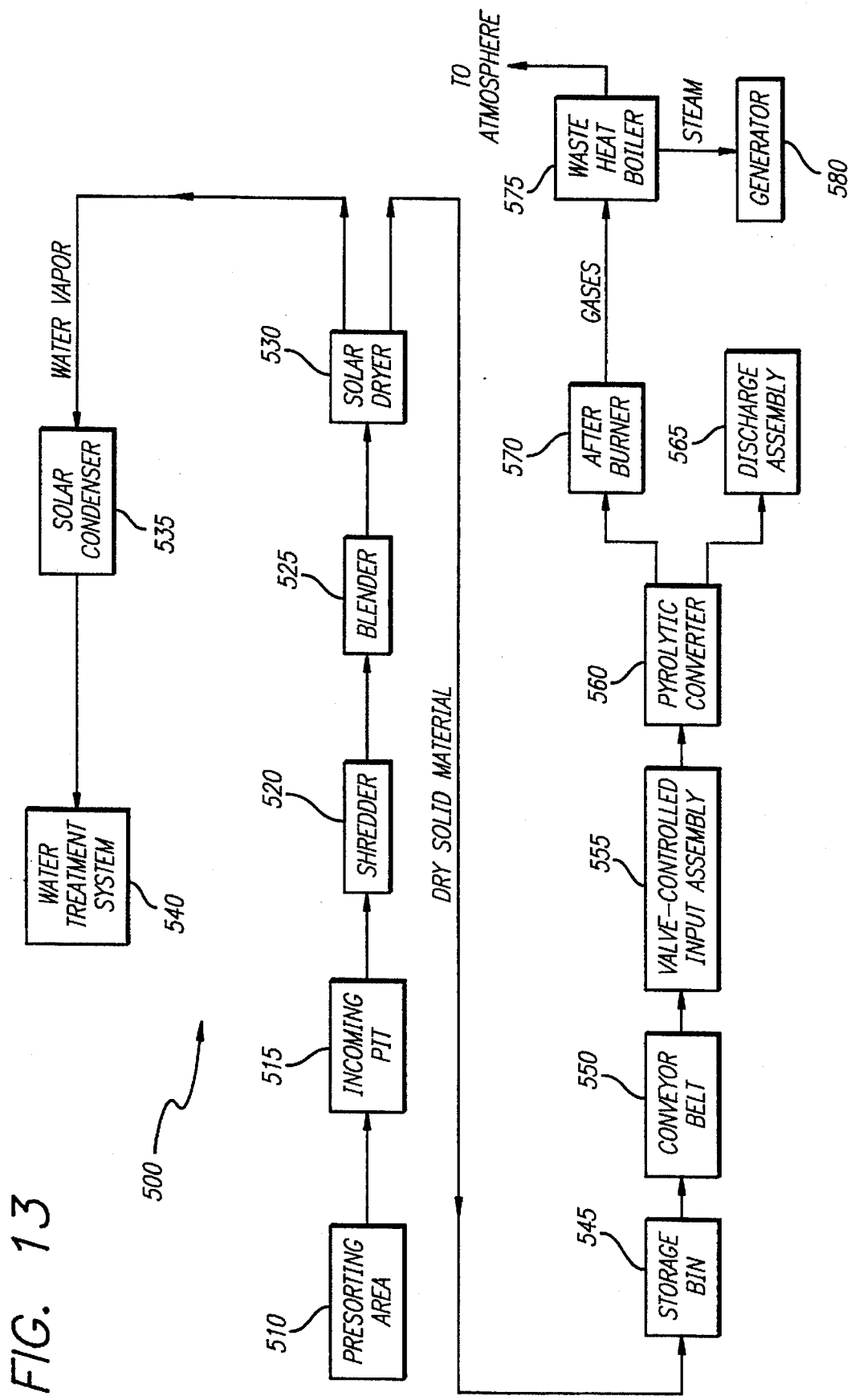
FIG. 13 is a flow chart illustrating some of the steps of a method according to the invention.

Referring now to FIG. 13, there is shown a flow diagram 500 of a preferred method in accordance with the invention. A quantity of municipal waste is pre-sorted at step 510 to remove most metals and other inorganic materials that will not be gassified by pyrolysis. The material next is moved through an incoming pit at step 515 to a shredder at step 520, which cuts the waste into portions of relatively uniform size. Next at step 525, the material is blended to make it of relatively uniform consistency and, at step 530, most of the moisture is removed from the material in a solar-heated dryer. The water vapor produced by the drying of the waste can be recycled as indicated by steps 535 and 540, through a solar condenser and then into a waste water treatment system. From the solar dryer, the waste is conveyed at step 545 to a storage bin at the treatment unit. At step 550, a conveyance arrangement such as a conveyor belt is used to take up waste from the storage bin and carry it to the input of the treatment unit, where at step 555, it is metered by the synchronized operation of valves onto the input end of the screw conveyor of the retort assembly in the pyrolytic converter. As the screw rotates, the organic constituents of waste material being carried along through the retort is converted by pyrolysis to hydrocarbon gases at step 560. Solid residue or ash remaining after pyrolysis is carried out of the retort and discharged at step 565 through an output assembly characterized by the same sort of synchronized valve operation as is the input assembly. The off-gases or vapor pyrosylate resulting from pyrolysis is conducted from the retort through an afterburner at step 570, where it is retained in a chamber until thermal oxidation has eliminated the harmful components of the gas before any gases are vented to the atmosphere, or as is depicted it step 575, before being routed to a waste heat boiler which, in turn, creates steam to supply a generator at step 580.

EXPOSITIVE EXAMPLE OF THE METHOD OF THE INVENTION

The waste material to be processed by pyrolysis in this example is the sludge generated by the hot roll process used in the formation of steel plates. Oxidized metal flakes from the surface of the plates during manufacture, which is immersed in an oil bath composed of hydrocarbons and animal fats. Accordingly, the resultant sludge is extremely heavy, on the order of 196 pounds (lbs.) per cubic foot. The sludge typically is composed of approximately seventy-five percent (75%) iron, of approximately twenty-four percent (24%) petroleum hydrocarbons and fatty acids, and a trace amount, on the order of one percent (1%), of metals.

To pre-treat the waste before it is introduced into a treatment unit of the invention, the sludge first is deposited on a vibrating screen which shakes out from the material rocks, shards of metals, and the like which are larger than about three-quarters of an inch (¾") in diameter. The sorted material then is placed by means of a front-end loader into a blender that tends to equalize the consistency of the sludge. After the temperature of the retort has been brought up to a specified temperature, for example, 1250° F., the material is metered from the blender, in pre-determined amounts into the screw conveyor in the conveyance tube that feeds waste to the charging hopper of the input stage to the retort.

From the charging hopper, the material is fed through the synchronized valves to the screw conveyor disposed in the retort, which is energized by its variable speed motor at whatever rate of rotation has been set at the control panel, the rate having been calculated to achieve the most complete gassification of the organic components of the waste that is possible.

The solid residue or carbon ash is discharged through the output assembly of the retort and then either is allowed to oxidize in air or is covered until it is cooled, when it is desirable to retain the residue in a non-oxidized state.

The gassified organic material is moved to the gas outlet at the output end of the retort due to positive pressure, and additional suction is supplied with an inductor fan at the output to insure that any flame from the burner cone supplying the thermal oxidizer will not enter the retort. The inductor fan also draws ambient air into the afterburner to sustain oxidation thus cleaning of the off-gases. The thermal oxidizer of the gas exhaust and cleaning arrangement normally is operated in the range of 1450°–1500° F., when the starting waste material is known to be free of PCBs, dioxins, or furans. However, if the material contains any of those contaminants, the temperature of the thermal oxidizer should be raised to about 2250° F., and the gases being treated should be retained in the oxidizer for at least two seconds.

From the foregoing, it will be appreciated that the waste treatment system of the invention provides enhanced maintainability without any adverse effect on the safety and efficiency with which it can be operated, thus improving the throughput and increasing the time period over which the system can function continuously.

While particular forms of the invention have been illustrated and described, it will be apparent to those of ordinary skill in the art that other modifications can be made without departing from the spirit and scope of the invention. For example, the nature of the invention would allow it to be adapted for processing materials other than that which can be properly characterized as waste. Accordingly, it is not intended that the invention be limited, except as by the appended claims.

What is claimed is:

1. A treatment unit for gassifying selected constituents of a composition of a starting material, the unit comprising:

containment means for containing the starting material while gassification is taking place, said means having a cross-sectional geometry such that when the cross-section is bisected by an imaginary line, said means further characterized by a first half and a second half, said first half having a first inner surface and said second half having a second inner surface;

means for introducing the starting material into said containment means;

means for impelling the starting material, wherein while gassification is taking place, said impelling means is oriented in said containment means such that said starting material is exposed to said first surface of said containment means substantially to the exclusion of exposure to said second surface of said containment means;

means for supplying energy to the interior of said containment means to initiate and sustain gassification of the selected constituents of the starting material;

means for removing from said containment means any residual constituents of the starting material that are not gassified during treatment; and means for removing the gases resulting from gassification from said containment means.

2. The treatment unit of claim 1, wherein said cross-section of said containment means is substantially ellipsoidal.

3. The treatment unit of claim 1, wherein said means for supplying energy is a heating chamber which is coaxial with, and which substantially surrounds said containment means.

4. The treatment unit of claim 3, wherein said heating chamber is provided with at least one aperture for injecting fuel gases into said heating chamber for combustion to supply heat energy.

5. The treatment unit of claim 1, wherein said means for removing solid residue comprises an output conduit fitted with a first valve and a second valve, each of said valves being capable of being retracted only when the other of said valves is closed, whereby the metered flow of solid residue out of the unit occurs without concomitant introduction of air into said containment means.

6. The treatment unit of claim 1, wherein said containment means further includes a screw conveyor having an input end and an output end, which rotates to effect movement of the starting material through said containment means while pyrolysis is taking place, said screw conveyor having a center shaft about which is disposed a plurality of helical flights at least one of said flights having a lifting tab.

7. The treatment unit of claim 6, wherein at least one of said flights further is provided with a sweeping brush.

8. A treatment unit for pyrolyzing constituent elements of a starting material that are susceptible of pyrolysis, the unit comprising:

a pyrolysis chamber in which pyrolysis is to take place, said pyrolysis chamber having an input aperture through which starting material is introduced, and at least one output aperture through which the products of pyrolysis can be discharged; and a heating chamber in which heat energy is generated to initiate and sustain pyrolysis in said pyrolysis chamber, wherein said heating chamber includes a conduit means for introducing heat energy directly into said pyrolysis chamber, thereby directly exposing the starting material to the heating chamber.

9. The treatment unit of claim 8, wherein said conduit means exits said heating chamber at a point proximal to one of said output apertures and enters said pyrolysis chamber at a point proximal to said input aperture.

10. The treatment unit of claim 9, wherein said conduit means is provided with a pump for conveying heat energy from said heating chamber to said pyrolysis chamber.

11. The treatment unit of claim 10, and further including at least one sensor within said conduit means for detecting the level of oxygen present in said conduit at any given time during operation.

12. A treatment unit for pyrolyzing the constituents of a starting material that are susceptible of pyrolysis, the unit comprising:

a pyrolysis chamber in which pyrolysis is to take place, said pyrolysis chamber having an input aperture through which starting material is introduced, a rotatable screw conveyor upon which the starting material is conveyed through said pyrolysis chamber, said screw conveyor provided with a center shaft having an input end and an output end, and at least one output aperture through which the products of pyrolysis can be discharged;

a heating chamber in which heat energy is generated to initiate and sustain pyrolysis in said pyrolysis chamber;

a sealing arrangement at the points where said input end and said output end of said screw conveyor extend out from said pyrolysis, said sealing arrangement having a winding of temperature-resistant cable about each said end of said screw conveyor, each winding being secured by an adjustable tension plate, said windings of cable allowing said screw conveyor to rotate while said tension plates prevent air from leaking into said pyrolysis chamber around said input end and said output end of said screw conveyor.

13. A treatment unit for gassifying selected constituents of a composition of a starting material, the unit comprising:

containment means for containing the starting material while gassification is taking place;

means for introducing the starting material into said containment means;

means for supplying energy to the interior of said containment means to initiate and sustain gassification of the selected constituents of the starting material;

means for removing from said containment means any residual constituents of the starting material that are not gassified during treatment; and means for removing the gases resulting from gassification from said containment means, said means including an oxidation chamber, a channel through which gasses from said containment means are directed by a pressure gradient to said oxidation chamber, said channel being in communication with a burner cone having a plurality of detachable gas injection ports that can be selectably removed without disrupting operation of said burner cone.

14. A method for pyrolyzing the hydrocarbon constituents of a starting material in a treatment unit, the treatment unit having a pyrolysis chamber in which pyrolysis takes place with an input aperture through which starting material is introduced and at least one output aperture through which the products of pyrolysis can be discharged, and a heating chamber in which heat energy is generated to initiate and sustain pyrolysis in the pyrolysis chamber, the heating chamber being in communication with the pyrolysis chamber through a heat-conveying conduit, the steps comprising:

combusting a fuel gas in the heating chamber to supply heat to the pyrolysis chamber;

conveying heat energy produced in the heating chamber into the pyrolysis chamber by conduction through the walls of the pyrolysis chamber;

conveying heat energy produced in the heating chamber directly into the pyrolysis chamber through the heat-conveying conduit;

continuously introducing the starting material into the treatment unit at a selectable and controllable rate while preventing the entry of oxygen into the pyrolysis chamber;

pyrolyzing the hydrocarbon constituents in the starting material; and removing the gaseous products and the solid residue produced by pyrolysis from the pyrolysis chamber at a rate consistent with the rate at which the starting material is being introduced.

* * * * *